(12) United States Patent
Senga et al.

(10) Patent No.: US 8,711,706 B2
(45) Date of Patent: Apr. 29, 2014

(54) PROTOCOL DELAY MEASURING DEVICE AND PROTOCOL DELAY MEASURING METHOD

(75) Inventors: Satoshi Senga, Kanagawa (JP); Kazushige Yamada, Kanagawa (JP); Ming-Fong Yeh, Taipei (JP)

(73) Assignee: Panasonic Corporation, Osaka (JP)

( * ) Notice: Subject to any disclaimer, the term of this patent is extended or adjusted under 35 U.S.C. 154(b) by 298 days.

(21) Appl. No.: 12/808,256

(22) PCT Filed: Dec. 15, 2008

(86) PCT No.: PCT/JP2008/003772
§ 371 (c)(1),
(2), (4) Date: Jun. 15, 2010

(87) PCT Pub. No.: WO2009/084166
PCT Pub. Date: Jul. 9, 2009

(65) Prior Publication Data
US 2010/0260062 A1 Oct. 14, 2010

(30) Foreign Application Priority Data
Dec. 28, 2007 (JP) ................................. 2007-339861

(51) Int. Cl.
H04L 12/26 (2006.01)
H04B 17/00 (2006.01)
H04W 24/08 (2009.01)

(52) U.S. Cl.
CPC ............ *H04L 43/0852* (2013.01); *H04L 43/04* (2013.01); *H04L 43/50* (2013.01); *H04B 17/0047* (2013.01); *H04W 24/08* (2013.01)
USPC ............................ 370/241; 709/224; 713/151

(58) Field of Classification Search
None
See application file for complete search history.

(56) References Cited

U.S. PATENT DOCUMENTS

| 6,363,477 | B1 * | 3/2002 | Fletcher et al. ............... 713/151 |
| 7,017,042 | B1 * | 3/2006 | Ziai et al. ...................... 713/161 |
| 7,095,990 | B2 | 8/2006 | Kurihara |
| 7,526,641 | B2 | 4/2009 | Sakai |
| 2003/0196081 | A1 * | 10/2003 | Savarda et al. ................ 713/153 |
| 2005/0286517 | A1 * | 12/2005 | Babbar et al. ................. 370/389 |
| 2007/0071007 | A1 * | 3/2007 | Ross ............................. 370/392 |

(Continued)

OTHER PUBLICATIONS

U.S. Appl. No. 09/284,995, filed May 14, 1999 to William Brent Wilson for "Apparatus and Method for Extracting Measures of a Bitstream's Processing Requirements for Decoding".

(Continued)

*Primary Examiner* — Khoa Huynh
(74) *Attorney, Agent, or Firm* — Greenblum & Bernstein, P.L.C.

(57) ABSTRACT

A protocol delay measuring device prevents an increase of the processing overhead of a communication terminal attributed to a protocol delay measurement. The measuring device determines the protocol delay by using first and second timestamps created respectively before and after a processed packet is obtained from an unprocessed packet by IPsec processing by the communication terminal. An acknowledges creates an identifier of the unprocessed packet. A timestamp database stores the created identifier along with the first timestamp and writes the identifier in a storage where the identifier is kept the same before and after the IPsec processing by the communication terminal. A correlator reads the identifier from the storage and extracts the first timestamp stored along with the same identifier as the read identifier in the timestamp database. A calculator calculates the difference between the extracted first timestamp and the second timestamp as the protocol delay.

18 Claims, 13 Drawing Sheets

(56) References Cited

U.S. PATENT DOCUMENTS

| | | | |
|---|---|---|---|
| 2007/0116285 A1* | 5/2007 | Nakai et al. | 380/255 |
| 2007/0214358 A1* | 9/2007 | Partis | 713/161 |
| 2010/0074113 A1 | 3/2010 | Muramoto et al. | |

OTHER PUBLICATIONS

Yasuhiro Fujuku et al., "Evaluation of harware-based IPsec processing method for embedded devices", IEICE Technical Report, Dec. 2007, vol. 107, No. 378, pp. 79-84.

Keiichi Sawa, "N+I Kensho Lab. Dai 21 Kai verification on No. 1 VPN Router 3 Seihin", N+I Network, Sep. 2005, vol. 5, No. 11, pp. 96-107.

Hidekazu Suzuki et al., "Implementation of Dynamic Process Resolution Protocol in Flexible Private Network", IPSJ SIG Technical Reports, Mar. 2005, vol. 2005, No. 33, pp. 199-204.

* cited by examiner

| TRACK MARK | INDEX NUMBER |
|---|---|
| AA55 | 1111 |

FIG.11A

| INDEX NUMBER | FIRST TIME STAMP | UNENCRYPTED PACKET SIZE |
|---|---|---|
| 1111 | 1171361475.474476 | 512 |

FIG.11B

| SECOND TIME STAMP |
|---|
| 1171361475.474692 |

FIG.11C

| INDEX NUMBER | ELAPSED TIME | TOTAL PACKET SIZE |
|---|---|---|
| 1111 | 216 | 512 |

| TRACK MARK | INDEX NUMBER |
|---|---|
| AA55 | 1111 |

FIG.12B

| INDEX NUMBER | FIRST TIME STAMP | UNENCRYPTED PACKET SIZE |
|---|---|---|
| 1111 | 1171361475.474476 | 4096 |

FIG.12C

| SECOND TIME STAMP |
|---|
| (1) 1171361475.474908 ↓ (2) 1171361475.475332 ↓ (3) 1171361475.475764 ↓ (4) 1171361475.476192 |

FIG.12D

| INDEX NUMBER | ELAPSED TIME | TOTAL PACKET SIZE |
|---|---|---|
| 1111 | 1716 | 4096 |

FIG.12E

| INDEX NUMBER | ELAPSED TIME | TOTAL PACKET SIZE |
|---|---|---|
| (1) 1111 ↓ (2) 1111 ↓ (3) 1111 ↓ (4) 1111 | 432 ↓ (+424) 856 ↓ (+432) 1288 ↓ (+428) 1716 | 1024 ↓ 2048 ↓ 3072 ↓ 4096 |

| TRACK MARK | INDEX NUMBER |
|---|---|
| AA55 | 2222 |

FIG.16A

| INDEX NUMBER | FIRST TIME STAMP | UNENCRYPTED PACKET SIZE |
|---|---|---|
| 2222 | 1171361475.474866 | N/A |

FIG.16B

| SECOND TIME STAMP |
|---|
| 1171361475.475086 |

FIG.16C

| INDEX NUMBER | ELAPSED TIME | TOTAL PACKET SIZE |
|---|---|---|
| 2222 | 220 | 512 |

FIG.16D

PROTOCOL DELAY MEASURING DEVICE AND PROTOCOL DELAY MEASURING METHOD

TECHNICAL FIELD

The present invention relates to an apparatus and a method for measuring protocol latency in environment of encrypted communication.

BACKGROUND ART

It is necessary to collect information about processing performance of a network system to monitor or manage a data communication network system, and, to collect this information, protocol latency in environment of encrypted communication is measured.

For example, Patent Document 1 discloses a conventional method of measuring protocol latency. According to this method, to measure protocol latency deriving from encryption processing in a kernel layer (i.e. communication protocol stack) in a communication terminal, the communication terminal encrypts in the application layer the same data as unprocessed data to which encryption processing is not yet applied, and stores the signature acquired upon encryption. Then, the unprocessed data is encrypted in the kernel layer, and the signature acquired upon encryption and the stored signature are compared to guarantee that data is the same before and after encryption in the kernel layer. Next, protocol latency is measured for the data that is guaranteed as the same data.

Patent Document 1: U.S. Pat. No. 6,363,477 Specification

DISCLOSURE OF INVENTION

Problems to be Solved by the Invention

However, according to the above conventional protocol latency measuring method, encryption processing for guaranteeing that data is the same before and after encryption processing for latency measurement targets is applied is executed separately, and therefore there is a problem that processing overhead increases in a communication terminal. This simply means that the CPU (Central Processing Unit) load doubles in the communication terminal, and the possibility that sufficient resources cannot be assigned to transmission/reception processing of network protocol increases. That is, the above protocol measurement is performed in environment that is substantially different from actual environment, and therefore the accuracy of measurement is not necessarily high.

In view of the above, it is therefore an object of the present invention to provide a protocol latency measuring apparatus and protocol latency measuring method for preventing an increase in processing overhead in communication terminals accompanying protocol latency measurement.

Means for Solving the Problem

The protocol latency measuring apparatus according to the present invention that measures protocol latency due to internet protocol security processing in a communication terminal, employs a configuration which includes: an identifier generating section that generates an identifier of an unprocessed packet; a database that stores the generated identifier with a first time stamp; a writing section that writes the generated identifier in a storage region which maintains the identifier same before and after the internet protocol security processing in the communication terminal; a retrieving section that retrieves the identifier written in the storage region; an extracting section that extracts the first time stamp stored in the database, with a same identifier as the retrieved identifier; and a calculating section that calculates a difference between the extracted first time stamp and a second time stamp, as protocol latency.

The protocol latency measuring method according to the present invention for measuring protocol latency due to internet protocol security processing in a communication terminal, includes: generating an identifier of an unprocessed packet; storing the generated identifier with a first time stamp; writing the generated identifier in a storage region that maintains the identifier same before and after the internet protocol security processing in the communication terminal; retrieving the identifier written in the storage region; extracting the first time stamp stored in the database, with a same identifier as the retrieved identifier; and calculating a difference between the extracted first time stamp and a second time stamp as protocol latency.

Advantageous Effects of Invention

According to the present invention, it is possible to prevent an increase in processing overhead in communication terminals accompanying protocol latency measurement.

BRIEF DESCRIPTION OF DRAWINGS

FIG. 11a shows an example of identification information acquired for a transmission data packet;

FIG. 11b shows an example of a time stamp record acquired for a transmission data packet;

FIG. 11c shows an example of a second time stamp acquired for a transmission data packet;

FIG. 11d shows an example of a statistical record acquired for a transmission data packet;

FIG. 12a shows an example of identification information acquired for a transmission data packet of a large size;

FIG. 12b shows an example of a time stamp record acquired for a transmission data packet of a large size;

FIG. 12c shows an example of a plurality of second time stamps acquired for a transmission data packet of a large size;

FIG. 12d shows an example of a statistical record acquired for a transmission data packet of a large size;

FIG. 12e shows an example of a statistical record updated for a transmission data packet of a large size;

FIG. 16(a) shows an example of identification information acquired for a received data packet;

FIG. 16(b) shows an example of a time stamp record acquired for a received data packet;

FIG. 16(c) shows an example of a second time stamp acquired for a received data packet; and FIG. 16(d) shows an example of a statistical record acquired for a received data packet.

BEST MODE FOR CARRYING OUT THE INVENTION

Hereinafter, an embodiment of the present invention will be explained in detail with reference to the accompanying drawings.

Figure 1:
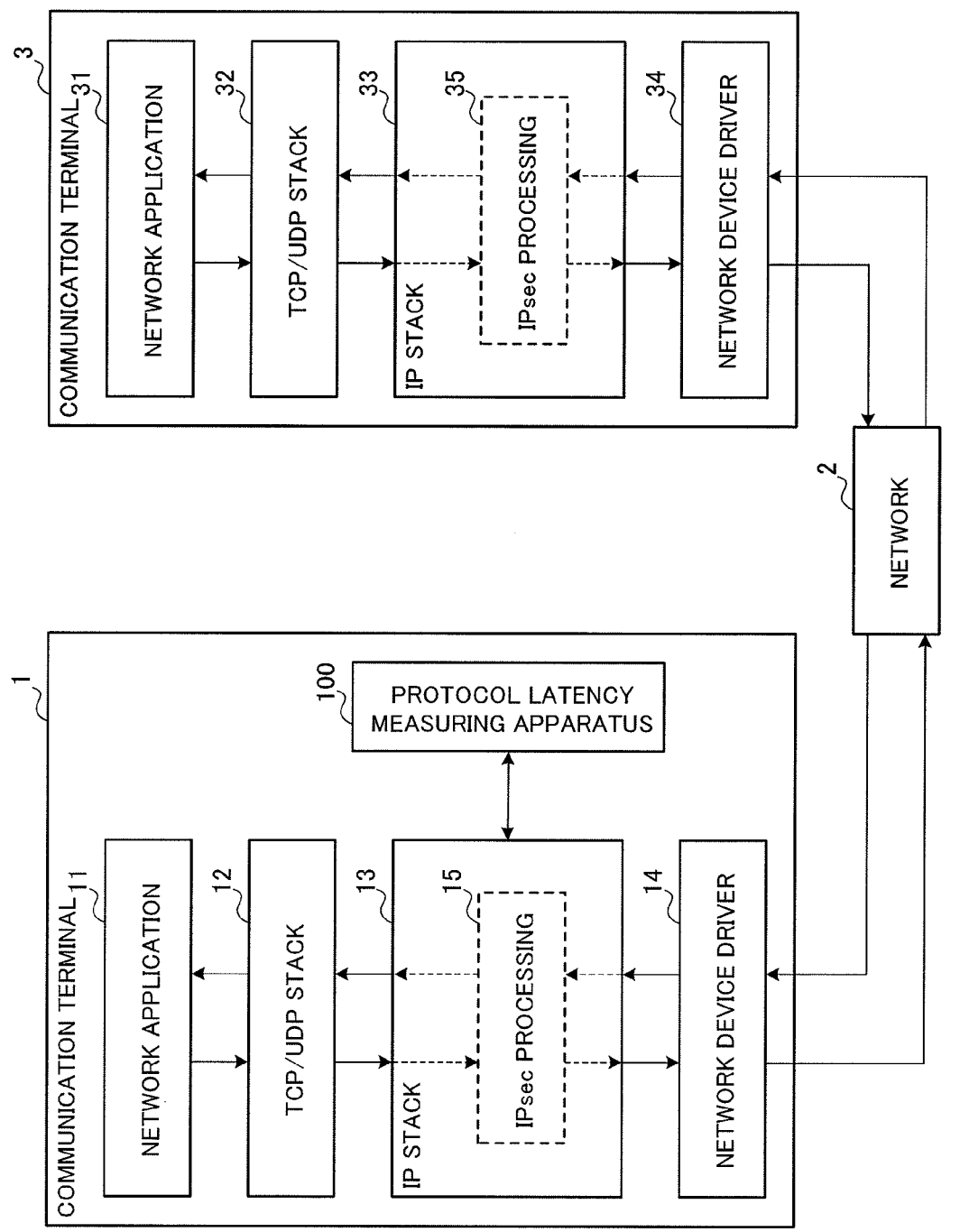
FIG. 1 is a block diagram showing a configuration of a communication network system according to an embodiment of the present invention.

FIG. 1 shows a configuration of a data communication network system according to an embodiment of the present invention. The data communication network system of FIG. 1 is configured such that communication terminal 1 can perform packet communication with communication terminal 3 through network 2.

Communication terminal 1 employs a configuration including a user module (not shown) that includes network application 11, and a protocol stack module (not shown) that includes TCP (Transmission Control Protocol)/UDP (User Datagram Protocol) stack 12 and IP (Internet Protocol) stack 13. The user module and protocol stack module may be configured by software alone or by combining software and hardware. Further, communication terminal 1 employs a configuration further including network device driver 14 that controls a physical device (not shown) which establishes connection to network 2, and protocol latency measuring apparatus 100 that will be explained below in detail.

IP stack 13 includes IPsec (Internet Protocol Security) processing 15. IPsec processing 15 is encryption processing (including encryption and decoding) applied to transmission data packets and received data packets in units of IP packets, and is directed to providing a data tampering prevention/security function. With the present embodiment, IPsec processing 15 targets at measuring protocol latency.

Communication terminal 3 employs a configuration including a user module (not shown) that includes network application 31, and a protocol stack module (not shown) that includes TCP (Transmission Control Protocol)/UDP (User Datagram Protocol) stack 33 and IP (Internet Protocol) stack 33. The user module and protocol stack module may be configured by software alone or by combining software and hardware. Further, communication terminal 3 employs a configuration further including network device driver 34 that controls a physical device (not shown) which establishes connection to network 2.

Further, with the present embodiment, although protocol latency measuring apparatus 100 is provided only in communication terminal 1, protocol latency measuring apparatus 100 may also be provided in communication terminal 3. Furthermore, with the present embodiment, although protocol latency measuring apparatus 100 is integrated with communication terminal 1 and is implemented, protocol latency measuring apparatus 100 may be provided separately from communication terminal 1, and connected to communication terminals 1 and 3 when necessary.

Figure 2:
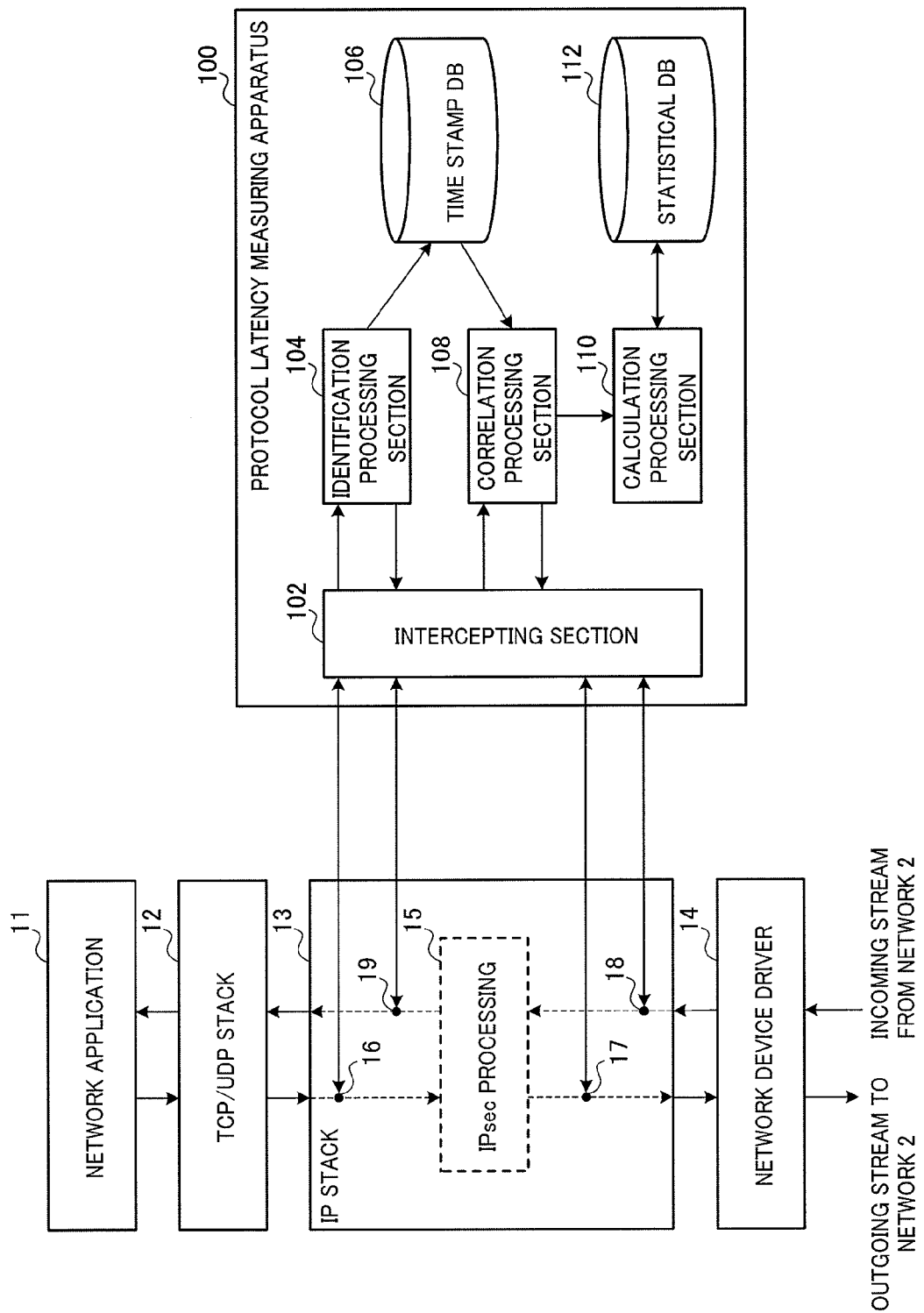
FIG. 2 is a block diagram showing a configuration of a protocol latency measuring apparatus according to an embodiment of the present invention.

FIG. 2 is a block diagram showing a configuration inside protocol latency measuring apparatus 100. Protocol latency measuring apparatus 100 has intercepting section 102, identification processing section 104, time stamp database (hereinafter "time stamp DB") 106, correlation processing section 108, calculation processing section 110 and the statistical database (hereinafter "statistical DB").

Intercepting section 102 intercepts transmission data packets or received data packets to be processed in communication terminal 1, at interception points 16, 17, 18 and 19 provided in the kernel layer. Interception points 16 to 19 are hook points such as NF_IP_LOCAL_OUT, NF_IP_POSTROUTING, NF_IP_LOCAL_IN and NF_IP_PRE_ROUTING provided by, for example, the Linux (registered trademark) net filter module. By registering the intercepting function of the above hook points in the Linux (registered trademark) net filter module, intercepting section 102 can perform interception. In case where interception points 16 to 19 are arranged immediately before or after IPsec processing 15 like the above hook points, it is possible to measure protocol latency accurately.

Intercepting section 102 intercepts at interception point 16 a transmission data packet to which IPsec processing 15 is not yet applied, intercepts at interception point 17 a transmission data packet to which IPsec processing 15 is already applied, intercepts at interception point 18 a received data packet to which IPsec processing 15 is not yet applied, and intercepts at interception point 19 a received data packet to which IPsec processing 15 is already applied. Further, intercepting section 102 returns to interception point 16 the data packet intercepted at interception point 16, returns to interception point 17 the data packet intercepted at interception point 17, returns to interception point 18 the data packet intercepted at interception point 18 and returns to interception point 19 the data packet intercepted at interception point 19.

Figure 3:
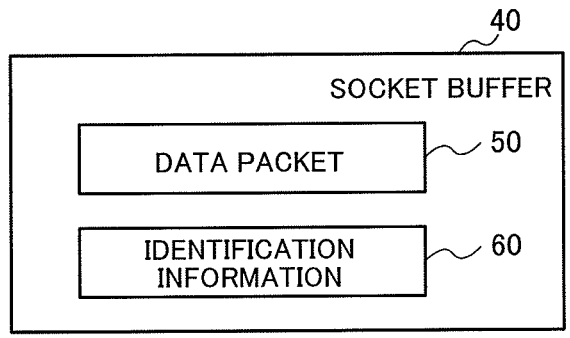
FIG. 3 shows a configuration of a socket buffer according to an embodiment of the present invention.

The data packets to be intercepted are stored in a buffer provided in communication terminal 1. As an example of such a buffer, FIG. 3 shows a configuration of socket buffer 40. Socket buffer 40 stores data packets processed in TCP/UDP stack 12 and IP stack 13 and various items of information used to manage and control processing in TCP/UDP stack 12 and IP stack 13, and is, for example, a Linux (registered trademark) kernel socket buffer (sk_buff). With the present embodiment, in addition to data packet 50, identification information 60 (described later) is stored in socket buffer 40. In case of the Linux (registered trademark) kernel socket buffer (sk_buff), identification information 60 is stored by recording a value of identification information 60 in nfmark or in nfcache.

Figure 4A:
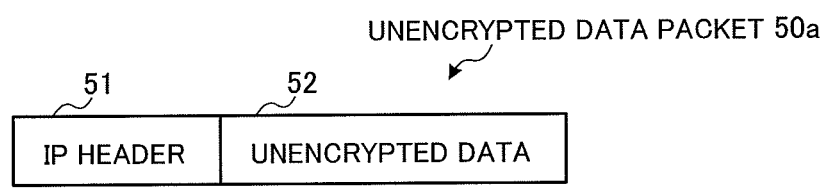
FIG. 4a shows a format of an unencrypted data packet.
Figure 4B:
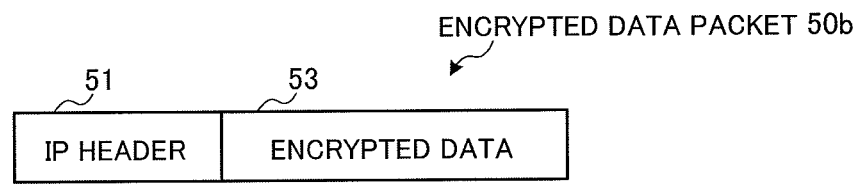
FIG. 4b shows a format of an encrypted data packet.

In case where data packet 50 is a transmission data packet, required IPsec processing 15 is encryption, and therefore a transmission data packet to which IPsec processing 15 is not yet applied is unencrypted data packet 50a including IP header 51 and unencrypted data 52 as shown in FIG. 4(a) and a transmission data packet to which IPsec processing 15 is already applied is encrypted data packet 50b including IP header 51 and encrypted data 53 as shown in FIG. 4(b). By contrast with this, in case where data packet 50 is a received data packet, required IPsec processing 15 is decoding, and therefore a received packet to which IPsec processing 15 is not yet applied is encrypted data packet 50b and a received data packet to which IPsec processing 15 is already applied is unencrypted data packet 50a.

Figure 4C:
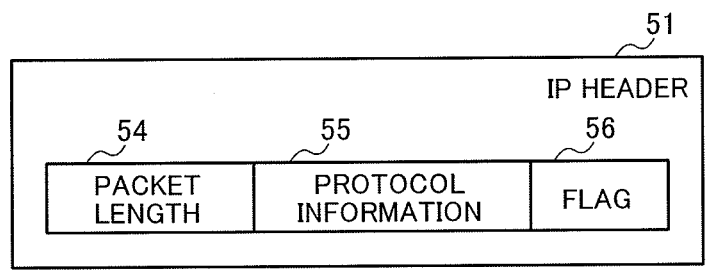
FIG. 4c shows a format of an IP header.

IP header 51 includes fields showing packet length 54, protocol information 55 and flag 56 as shown in FIG. 4(c). Packet length 54 represents the total length of data packet 50, and protocol information 55 is used to decide whether data packet 50 is unencrypted data packet 50a or encrypted data packet 50b. In case where data packet 50 is encrypted data packet 50b, IP header shows an IP security protocol (for example, an AH (Authentication Header) protocol and an ESP (Encapsulating Security Payload) protocol) as protocol information 55. Flag 56 is a flag that is set to either "0" or "1" for a fragmented data packet. For example, flag 56 is set to "0" to indicate that the data packet is not the last data packet and there is a subsequent fragment, and is set to "1" to indicate that the data packet is the last data packet and there is no subsequent fragment.

Identification processing section 104 that functions as an identifier generating means, a writing means and a time stamp generating means stores a protocol latency measuring program in a storing apparatus (not shown), and is operated by executing this program by the CPU (not shown). Identification processing section 104 executes identification processing with respect to intercepted data packets, generates identification information by identification processing and writes this information in socket buffer 40, and generates a time stamp record including, for example, a time stamp by identification processing and stores this time stamp record in time stamp DB 106. The identification processing will be explained later in detail.

Figure 5:
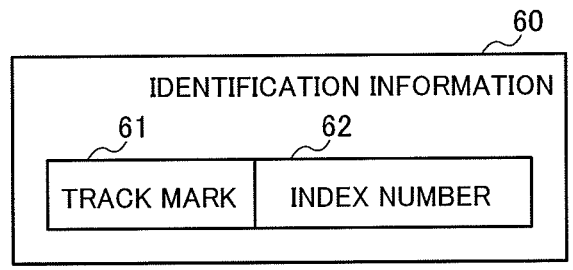
FIG. 5 shows a format of identification information according to an embodiment of the present invention.

Note that, as shown in FIG. 5, identification information 60 includes track mark 61 and index number 62.

Track mark 61 is information used to decide whether or not processing for measuring protocol latency is applied to data packet 50, and may be a constant such as "AA55," a flag such as "4000" and so on. As to track mark 61, track mark 61 of the same value is assigned to data packet 50 belonging to different streams.

Index number 62 is information as an identifier of data packet 50 used to perform search in time stamp DB 106. For example, index number 62 of the same value is assigned to data packet 50 belonging to the same stream, and index number 62 of a different value such as "1111" or "2222" is assigned to data packet 50 belonging to a different stream. By this means, in case where communication terminal 1 accommodates a plurality of streams simultaneously, it is possible to measure protocol latency for each stream.

Each of track mark 61 and index number 62 is data that can be generated by simple processing without involving a complicated arithmetic operation, and therefore does not increase load on the CPU.

Figure 6:
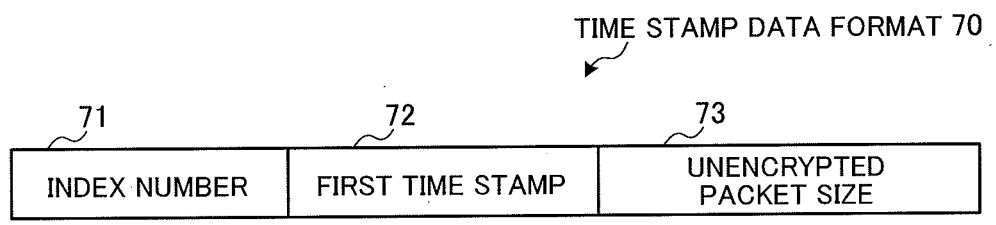
FIG. 6 shows a time stamp data format according to an embodiment of the present invention.

Further, the time stamp record stored in time stamp DB 106 includes time stamp data format 70 including fields representing index number 71, first time stamp 72 and unencrypted packet size 73 as shown in FIG. 6. Index number 71 is the same as index number 62. First time stamp 72 is a time stamp specifying the timing to start applying IPsec processing 15. Unencrypted packet size 73 indicates the total length of unencrypted data packet 50a.

Time stamp DB 106 is configured with a storing apparatus that stores a time stamp record resulting from the identification processing.

Correlation processing section 108 that functions as a retrieving means, an extracting means and a time stamp generating means stores a protocol latency measuring program in a storing apparatus (not shown), and is operated by executing this program by the CPU (not shown). Correlation processing section 108 executes correlation processing with respect to an intercepted data packet, and generates a second time stamp by correlation processing. The second time stamp is used for calculation processing (described later). The correlation processing will be explained in detail below.

Calculation processing section 110 that functions as a calculating means stores the protocol latency measuring program in the storing apparatus (not shown), and is operated by executing this program by the CPU. Calculation processing section 110 executes calculation processing for measuring protocol latency by calculating the difference between the first time stamp and the second time stamp, generates a statistical record indicating the measurement result and stores this record in statistical DB 112. The calculation processing will be explained in detail below.

Statistical DB 112 is formed with the storing apparatus that stores the statistical record indicating the protocol latency measurement result. For example, in case where processing performance is evaluated, statistical DB 112 can report a protocol latency measurement result by outputting a statistical record stored inside.

Figure 7:
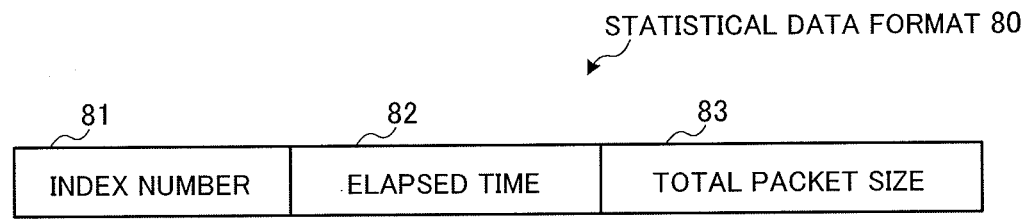
FIG. 7 shows a statistical data format according to an embodiment of the present invention.

As shown in FIG. 7, the statistical record stored in statistical DB 112 has statistical data format 80 including fields that indicate index number 81, elapsed time 82 and total packet size 83. Index number 81 is the same as index numbers 62 and 71. Elapsed time 82 is the value (i.e. a cumulative value in case of fragments) acquired by subtracting a value of the first time stamp from the value of the second time stamp, and corresponds to the value of protocol latency. Total packet size 83 is a packet size (i.e. a cumulative value in case of fragments) that is assigned same index number 81 and is used to calculate elapsed time 82.

Hereinafter, two cases will be roughly explained for a series of processings for measuring protocol latency, including identification processing by identification processing 104, correlation processing by correlation processing section 108 and calculating processing by calculation processing section 110. In the first case, protocol latency due to IPsec processing 15 applied to a transmission data packet, that is, due to encryption, is measured, and, in the second case, protocol latency due to IPsec processing 15 applied to a received data packet, that is, due to decoding, is measured.

Figure 8:
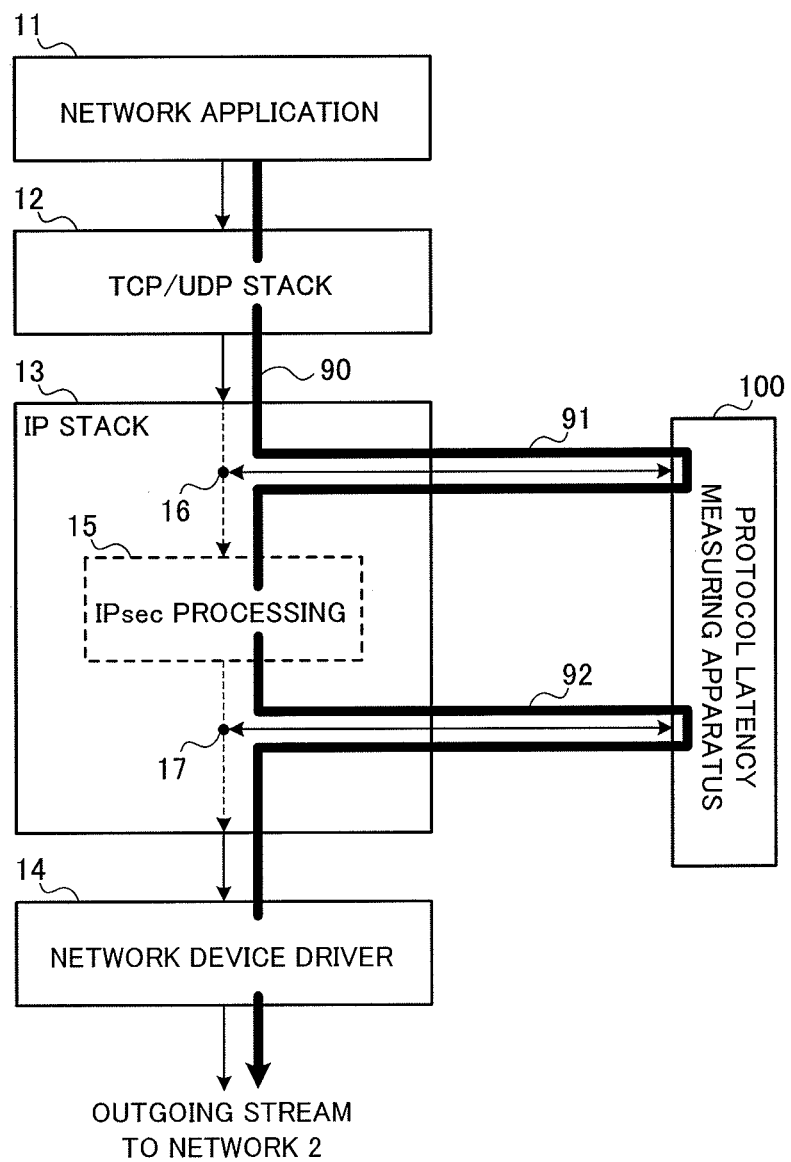
FIG. 8 shows a processing flowchart in case of packet transmission, according to an embodiment of the present invention.

First, the first case will be explained. FIG. 8 is a processing flowchart in the first case. A transmission data packet is intercepted twice on the way from upper layer to lower layer following route 90. The first interception is performed before encryption. To be more specific, the transmission data packet is intercepted at interception point 16 before encryption, is processed in protocol latency measuring apparatus 100 and is returned to interception point 16 (interception route 91). The second interception is performed after encryption. To be more specific, the transmission data packet is intercepted at interception point 17 after encryption, is processed in protocol latency measuring apparatus 100 and is returned to interception point 17 (interception route 92).

Figure 9:
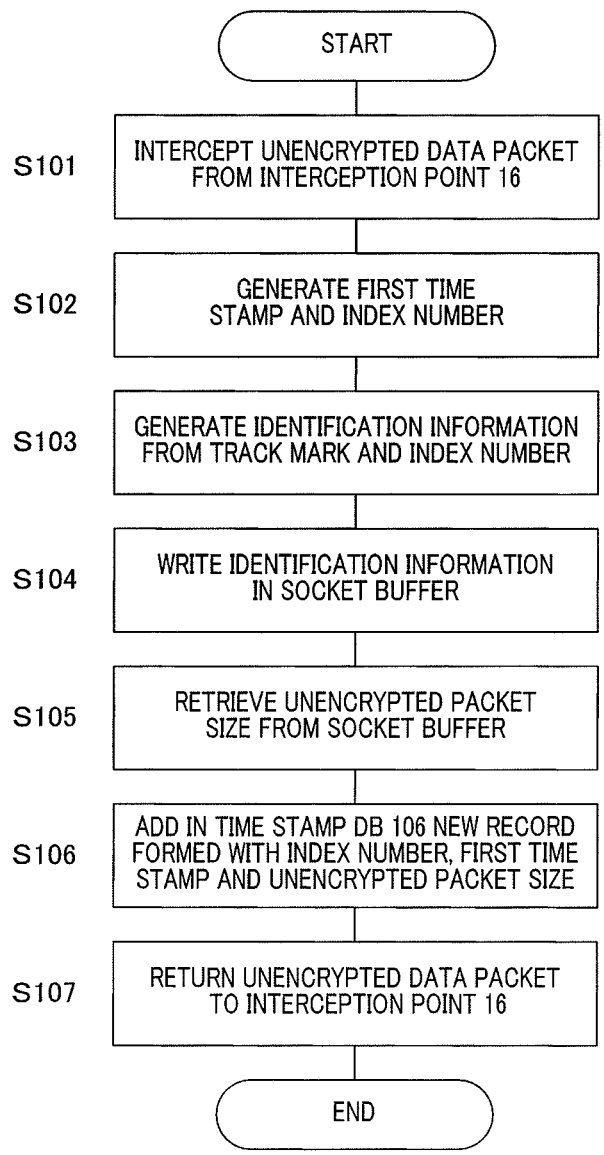
FIG. 9 is a flowchart explaining an operation of a protocol latency measuring apparatus before IPsec processing in case of packet transmission is applied, according to an embodiment of the present invention.

As shown in FIG. 9, operations including identification processing by identification processing section 104 are executed in protocol latency measuring apparatus 100, with respect to transmission data packets following interception route 91, that is, with respect to unencrypted data packets.

FIG. 9 is a flowchart explaining the operation performed in protocol latency measuring apparatus 100, with respect to an unencrypted data packet following interception route 91.

First, in step S101, intercepting section 102 intercepts a data packet from interception point 16. This is started, for example, when a request for measuring protocol latency is received.

Further, with the present embodiment, intercepting section 102 is configured to intercept at interception point 16 only transmission data packets before encryption. However, in case where encrypted transmission data packets can also be intercepted at interception point 16, intercepting section 102 can decide whether the data packets are unencrypted or encrypted with reference to the data packet protocol information stored in the socket buffer.

Then, in step S102, identification processing section 104 generates a time stamp (i.e. the first time stamp), and generates an index number as an identifier for the intercepted unencrypted data packet. As described above, the first time stamp is generated in accordance with the timing the unencrypted data packet to which IPsec processing is not yet applied is intercepted, so that it is possible to more accurately specify the timing to start applying IPsec processing, and improve the accuracy of protocol latency measurement.

Then, in step S103, identification processing section 104 combines a predetermined track mark and the generated index number to generate identification information. FIG. 11(a) shows an example of identification information to be generated.

Then, in step S104, identification processing section 104 writes the generated identification information in the socket buffer.

Then, in step S105, identification processing section 104 retrieves the packet length in the IP header of a data packet stored in the socket buffer, to acquire the packet size of the unencrypted data packet.

Then, in step S106, identification processing section 104 generates a time stamp record by setting the generated index number in the index number field, the generated first time stamp in the first time stamp field and the acquired packet size in the unencrypted packet size field, in the predetermined time stamp data format. FIG. 11(b) shows an example of the time stamp record to be generated. Then, identification processing section 104 stores the generated time stamp record in time stamp DB 106 to add a new record in time stamp DB 106.

Then, in step S107, intercepting section 102 returns the unencrypted data packet intercepted in step S101, to interception point 16. The returned unencrypted data packet is transmitted to IPsec processing 15, and is encrypted there to be an encrypted data packet.

In this way, the transmission data packet follows interception route 91 before IPsec processing 15 is applied, so that a time stamp for specifying the timing to start applying IPsec processing 15 is acquired, and, further, identification information of this transmission data packet is stored in the socket buffer for this transmission data packet.

Figure 10:
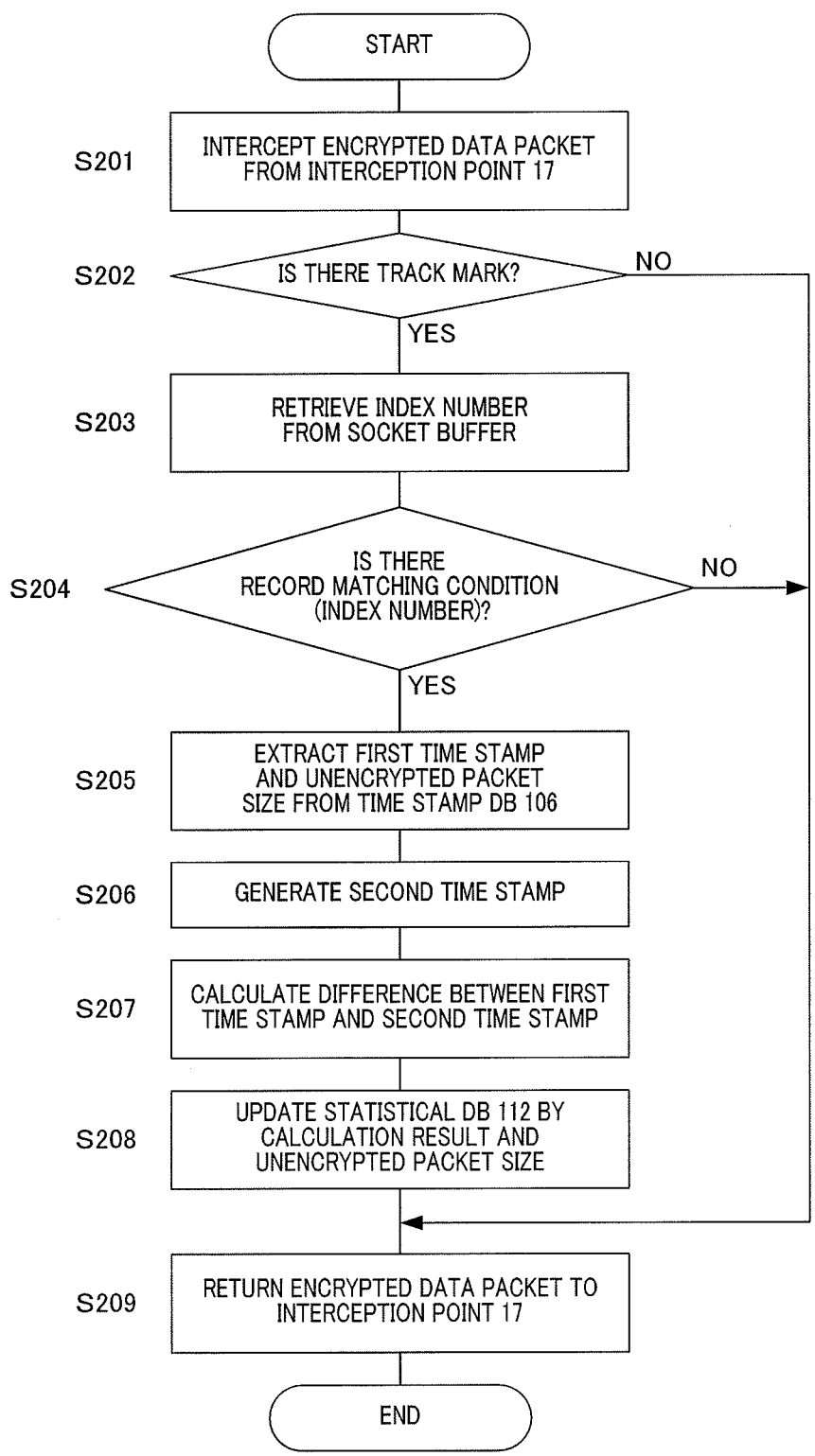
FIG. 10 is a flowchart explaining an operation of a protocol latency measuring apparatus after IPsec processing in case of packet transmission is applied, according to an embodiment of the present invention.

As shown in FIG. 10, operations including correlation processing by correlation processing section 108 and calculation processing by calculation processing section 110 are executed in protocol latency measuring apparatus 100, with respect to transmission data packets following interception route 92, that is, with respect to encrypted data packets.

FIG. 10 is a flowchart explaining the operation performed in protocol latency measuring apparatus 100, with respect to encrypted data packets following interception route 92.

First, in step S201, intercepting section 102 intercepts the data packet from interception point 17. Similar to the operation explained using FIG. 9, this is started when a request for measuring protocol latency is received.

Further, with the present embodiment, intercepting section 102 is configured to intercept at interception point 17 only transmission data packets after encryption. However, in case where transmission data packets before encryption can also be intercepted at interception point 16, intercepting section 102 can decide whether the data packets are unencrypted or encrypted with reference to protocol information of the data packets stored in the socket buffer.

Then, in step S202, correlation processing section 108 decides whether or not there is a track mark by deciding whether or not a setting value of a predetermined storage region is set to a predetermined value in a socket buffer of the intercepted encrypted data packet. In case there is a track mark, the step proceeds to step S203, and, in case where there is not a track mark, the step proceeds to step S210. As described above, by deciding whether or not there is a track mark including a predetermined value, it is possible to readily check whether or not there is identification information.

In step S203, correlation processing section 108 retrieves an index number from the socket buffer. In the operation explained using FIG. 9, this index number is generated for the unencrypted data packet to which IPsec processing is not yet applied. When IPsec processing 15 is applied to the unencrypted data packet, the unencrypted data packet becomes an encrypted data packet. By contrast with this, identification information stored in the socket buffer does not change after IPsec processing is applied and is maintained, so that the index number retrieved from the socket buffer for the encrypted data packet is the same as the index number generated before the encrypted data packet is encrypted. Accordingly, correlation processing section 108 can acquire the index number stored in the socket buffer, as the index number of the encrypted data packet.

Then, in step S204, correlation processing section 108 searches for a time stamp record in time stamp DB 106 using the retrieved index number as the search condition. To be more specific, correlation processing section 108 searches for at least one time stamp record that is stored in time stamp DB 106 and that has the same index number as the retrieved index number. As a result of search, if such a time stamp record is specified in time stamp DB 106, the step proceeds to step S205, and, if such a time stamp record is not specified in time stamp DB 106, the step proceeds to step S209.

Then, in step S205, correlation processing section 108 extracts the first time stamp and the unencrypted packet size from time stamp DB 106 by retrieving the specified time stamp record, and reports the first time stamp and the unencrypted packet size to calculation processing section 110. Preferably, correlation processing section 108 deletes the retrieved time stamp from time stamp DB 106 at this time. By this means, it is possible to efficiently use the storage region assigned to time stamp DB 106.

Then, in step S206, correlation processing section 108 generates and reports the second time stamp to calculation processing section 110. FIG. 11(c) shows an example of the second time stamp to be generated. As described above, the second time stamp is generated in accordance with the timing the encrypted data packet to which IPsec processing is already applied is intercepted, so that it is possible to more accurately specify the timing to finish applying IPsec processing and improve the accuracy of protocol latency measurement.

Then, in step S207, calculation processing section 110 calculates the difference between the first time stamp and the second time stamp. The first time stamp is directed to specifying the timing to start applying IPsec processing and the second time stamp is directed to specifying the timing to finish applying IPsec processing, and therefore the calculated difference corresponds to the elapsed time from the start of application of IPsec processing 15 to the end of application of IPsec processing 15.

Then, in step S208, calculation processing section 110 generates a statistical record by setting the reported index number in the index number field, the calculated elapsed time in the elapsed time field and the reported unencrypted packet size in the total packet size field, in the predetermined statistical data format. FIG. 11(d) shows an example of the statistical record to be generated. When it is necessary to add elapsed time, for example, when the statistical record including the same index number is already stored in statistical DB 112, the statistical record is generated by retrieving the elapsed time and total packet size of the statistical record stored in statistical DB 112 and by adding the calculated elapsed time and the reported unencrypted packet size. Then, calculation processing section 110 updates statistical DB 112 by storing the generated statistical record in statistical DB 112.

Then, in step S209, intercepting section 102 returns the encrypted data packet intercepted in step S201, to interception point 17. The returned encrypted data packet is sent to network device driver 14.

As described above, the transmission data packet follows interception route 92 after IPsec processing 15 is applied, so that the time stamp for specifying the timing to finish applying IPsec processing 15 is acquired, and, further, identification information of this transmission data packet is acquired from the socket buffer for this transmission data packet.

As described above, the identification information of the transmission data packet does not change even if IPsec processing 15 is applied to this transmission data packet, so that it is possible to identify the transmission data packet at ease.

A case will be explained here where the transmission data packet intercepted from interception point 16 includes a larger packet size than MTU (Maximum Transmission Unit).

The transmission data packet including a larger size than MTU is fragmented before IPsec processing is applied. Therefore, with the present embodiment, intercepting section 102 intercepts transmission data packets including a larger size than MTU prior to fragmentation. Further, interception point 16 is arranged in a position to realize this. By this means, it is possible to efficiently generate only one first time stamp for specifying the timing to start applying IPsec processing and efficiently generate only one item of identification information and one time stamp record for transmission data packets of a larger size. FIG. 12(a) and FIG. 12(b) show examples of identification information and a time stamp record.

N (where N is an integer of two or more) fragments acquired by fragmenting one unencrypted data packet become N encrypted data packets after IPsec processing 15 is applied. These encrypted data packets are intercepted sequentially from interception point 17.

Correlation processing section 108 generates second time stamps individually for the N encrypted data packets sequentially intercepted. For example, in case of N=4, as shown in FIG. 12(c), four second time stamps are generated.

In parallel to generation of second time stamps, correlation processing section 108 decides whether or not each of the encrypted data packets intercepted sequentially is the final packet. This decision is based on a packet size or based on a flag.

In case of the former, correlation processing section 108 sequentially measures the sizes of individual encrypted data packets intercepted sequentially, and sequentially adds these sizes. Then, when the added value reaches the unencrypted packet size extracted from time stamp DB 106, it is possible to decide that the encrypted data packet that is lastly added is the last packet.

In case of the latter, correlation processing section 108 refers to the flags of individual encrypted data packets intercepted sequentially. Then, it is possible to decide as the last packet the encrypted data packet that is not followed by a packet and that raises a flag indicating the last packet.

When the last packet is specified, correlation processing section 108 reports to calculation processing section 110 the second time stamp generated when the last packet is intercepted. Consequently, even if N second time stamps are generated, calculation processing section 110 can finish measuring the protocol latency of N segmented data packets by calculating elapsed time once as shown in FIG. 12(d).

Further, even in case where all of N second time stamps are reported, if correlation processing section 108 reports which second time stamp is the last packet, calculation processing section 110 can measure protocol latency for the N segmented data packets and finish measuring protocol latency at the same timing as in the case where only the second time stamp of the last packet is reported.

Further, to measure protocol latency for N segmented data packets, it is equally possible to calculate the difference between second time stamps generated for two segmented data packets intercepted successively and add these second time stamps in addition to calculation of the difference between the first time stamp and the second time stamp in step S207 in the operation explained using FIG. 10. A case of N=4 will be explained as an example using FIG. 12(e). For the first segmented data packet, the difference (432) between the second time stamp for this packet and the first time stamp is calculated to hold the calculation result in statistical DB 112 as a new record. For the second segmented data packet, the difference (424) between the second time stamp for this packet and the second time stamp for the first segmented data packet is calculated, and those differences (432+424=856) are added to update the record based on this calculation result. For the third segmented data packet, the difference (432) between the second time stamp for this packet and the second time stamp for the second segmented data packet, and those differences (856+432=1288) are added to update the record based on this calculation result. For the fourth segmented data packet, the difference (428) between the second time stamp for this data packet and the second time stamp for the third segmented data packet is calculated, and these differences (1288+428=1716) are added to update the record based on this calculation result. When correlation processing section 108 reports that the fourth segmented data packet is the last packet, calculation processing section 110 can finish measuring protocol latency for these segmented data packets.

Figure 13:
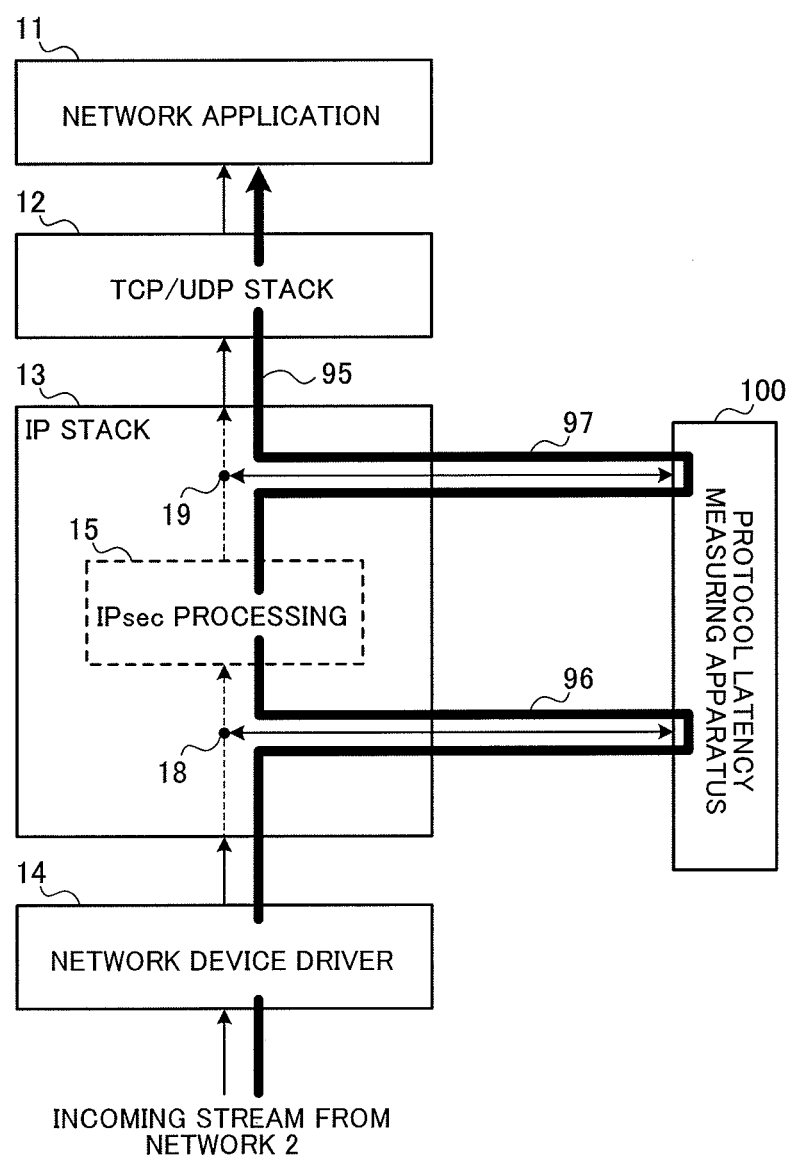
FIG. 13 shows a processing flowchart in case of packet reception according to an embodiment of the present invention.

Next, the second case will be explained. FIG. 13 is a processing flowchart in the second case. A received data packet is intercepted twice on the way from lower layer to upper layer following route 95. The first interception is performed before decoding. To be more specific, the received data packet is intercepted at interception point 18 before decoding, is processed in protocol latency measuring apparatus 100 and is returned to interception point 18 (interception route 96). The second interception is performed after decoding. To be more specific, the received data packet is intercepted at interception point 19 after decoding, is processed in protocol latency measuring apparatus 100 and is returned to interception point 19 (interception route 97).

Figure 14:
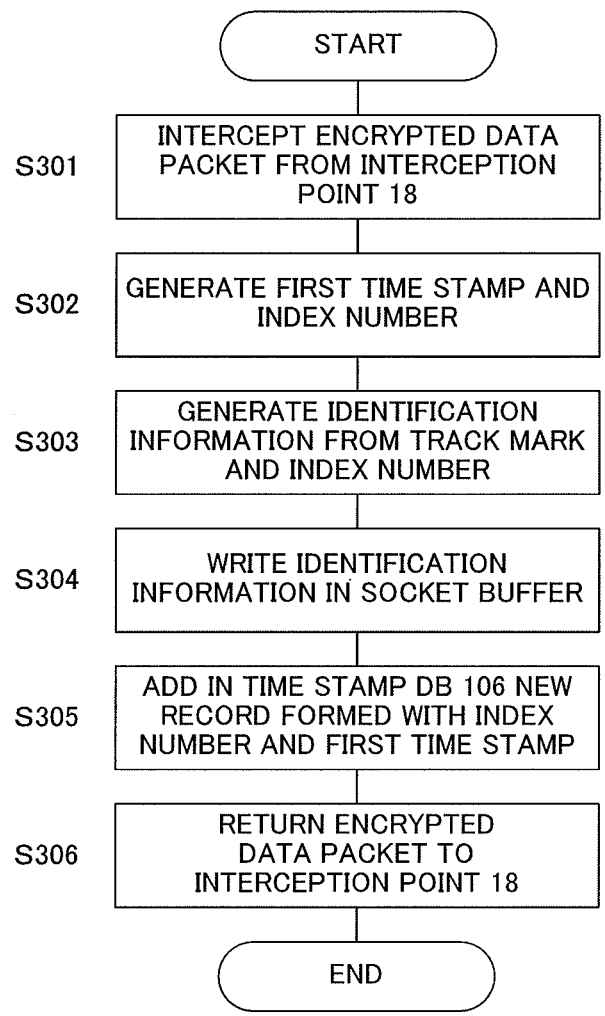
FIG. 14 is a flowchart explaining an operation of a protocol latency measuring apparatus before IPsec processing in case of packet reception is applied, according to an embodiment of the present invention.

As shown in FIG. 14, operations including identification processing by identification processing section 104 are executed in protocol latency measuring apparatus 100, with respect to the received data packet following interception route 96, that is, with respect to the encrypted data packet.

FIG. 14 is a flowchart explaining the operation performed in protocol latency measuring apparatus 100, with respect to an encrypted data packet following interception route 96.

First, in step S301, intercepting section 102 intercepts a data packet from interception point 18. This is started, for example, when a request for measuring protocol latency is received.

Further, with the present embodiment, intercepting section 102 is configured to intercept at interception point 18 only a received data packet before decoding. However, in case where decoded transmission data packets can also be intercepted at interception point 18, intercepting section 102 can decide whether or not the data packet is decoded with reference to the data packet protocol information stored in the socket buffer.

Then, in step S302, identification processing section 104 generates a time stamp (i.e. the first time stamp), and generates an index number as an identifier for the intercepted encrypted data packet. As described above, the first time stamp is generated in accordance with the timing the encrypted data packet to which IPsec processing is not yet applied is intercepted, so that it is possible to more accurately specify the timing to start applying IPsec processing, and improve the accuracy of protocol latency measurement.

Then, in step S303, identification processing section 104 combines a predetermined track mark and the generated index number to generate identification information. FIG. 16(*a*) shows an example of identification information to be generated.

Then, in step S304, identification processing section 104, identification processing section 104 writes the generated identification information in the socket buffer.

Then, in step S305, identification processing section 104 generates a time stamp record by setting the generated index number in the index number field and the generated first time stamp in the first time stamp field, in the predetermined time stamp data format. FIG. 16(*b*) shows an example of the time stamp record to be generated. Then, identification processing section 104 stores the generated time stamp record in time stamp DB 106 to add a new record in time stamp DB 106.

Then, in step S306, intercepting section 102 returns the encrypted data packet intercepted in step S301, to interception point 18. The returned encrypted data packet is transmitted to IPsec processing 15, and is decoded there to be an unencrypted data packet.

In this way, the received data packet follows interception route 96 before IPsec processing 15 is applied, so that a time stamp for specifying the timing to start applying IPsec processing 15 is acquired, and, further, identification information of this received data packet is stored in the socket buffer of this received data packet.

Figure 15:
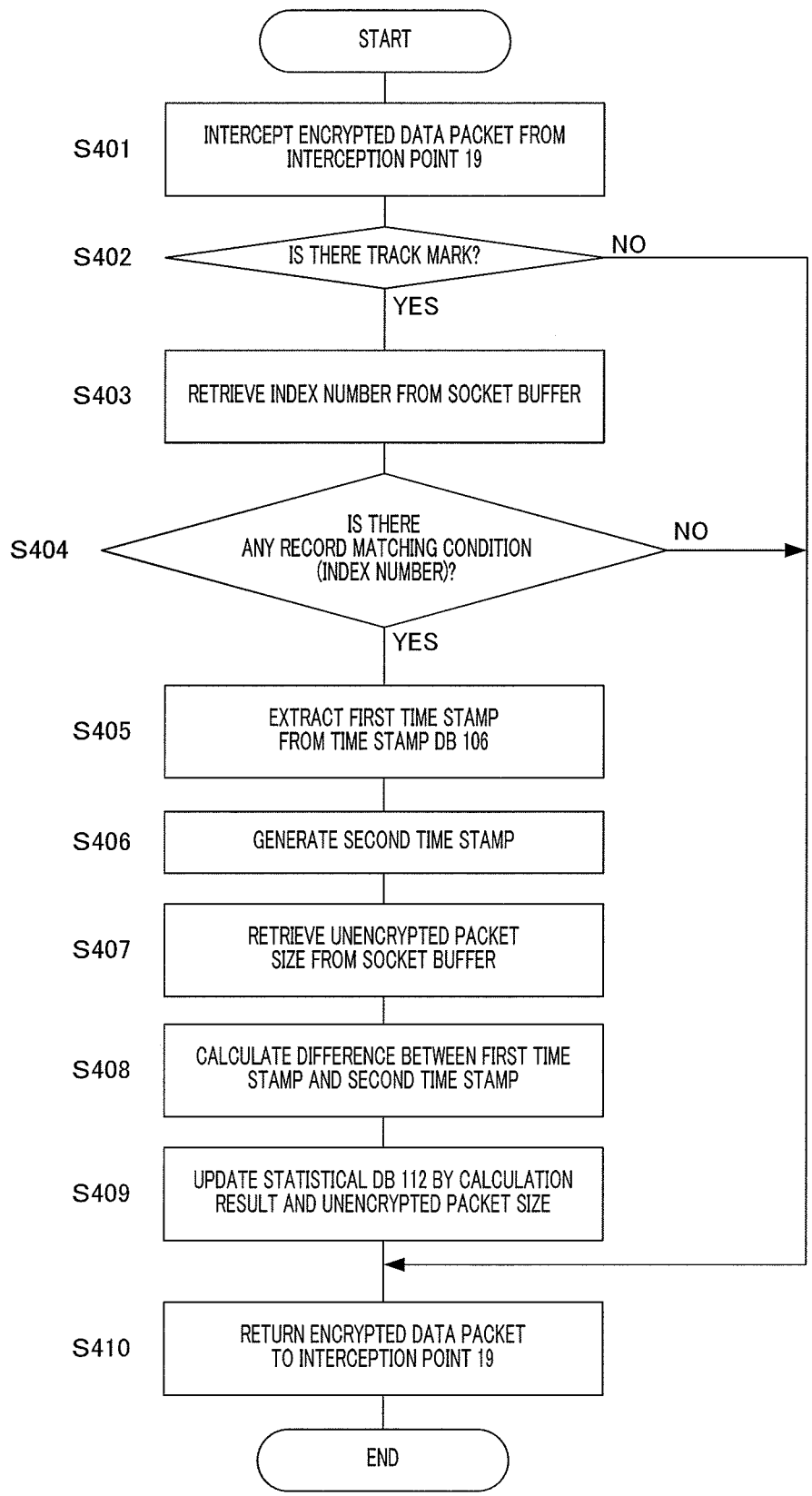
FIG. 15 is a flowchart explaining an operation of a protocol latency measuring apparatus after IPsec in case of packet reception is applied, according to an embodiment of the present invention.

As shown in FIG. 15, operations including correlation processing by correlation processing section 108 and calculation processing by calculation processing section 110 are executed in protocol latency measuring apparatus 100, with respect to received data packets following interception route 97, that is, with respect to unencrypted data packets.

FIG. 15 is a flowchart explaining the operation performed in protocol latency measuring apparatus 100, with respect to encrypted data packets following interception route 97.

First, in step S401, intercepting section 102 intercepts the data packet from interception point 19. Similar to the operation explained using FIG. 14, this is started when a request for measuring protocol latency is received.

Further, with the present embodiment, intercepting section 102 is configured to intercept at interception point 19 only a decoded received data packet. However, in case where received data packets before decoding can also be intercepted at interception point 19, intercepting section 102 can decide whether or not the data packet is decoded with reference to protocol information of the data packet stored in the socket buffer.

Then, in step S402, correlation processing section 108 decides whether or not there is a track mark by deciding whether or not a setting value of a predetermined storage region is set to a predetermined value in a socket buffer for the intercepted unencrypted data packet. In case there is a track mark, the step proceeds to step S403, and, in case where there is no track mark, the step proceeds to step S410. As described above, by deciding whether or not there is a track mark including a predetermined value, it is possible to readily check whether or not there is identification information.

In step S403, correlation processing section 108 retrieves an index number from the socket buffer. In the operation explained using FIG. 15, this index number is generated for the encrypted data packet to which IPsec processing is not yet applied. When IPsec processing 15 is applied to the encrypted data packet, the encrypted data packet becomes an unencrypted data packet. By contrast with this, identification information stored in the socket buffer does not change after IPsec processing is applied and is maintained, so that the index number retrieved from the socket buffer for the unencrypted data packet is the same as the index number generated before the encrypted data packet is decoded. Accordingly, correlation processing section 108 can acquire the index number stored in the socket buffer, as the index number of the unencrypted data packet.

Then, in step S404, correlation processing section 108 searches for a time stamp record in time stamp DB 106 using the retrieved index number as the search condition. To be more specific, correlation processing section 108 searches for at least one time stamp record that is stored in time stamp DB 106 and that is the same as the retrieved index number. As a result of search, if such a time stamp record is specified in time stamp DB 106, the step proceeds to step S405, and, if such a time stamp record is not specified in time stamp DB 106, the step proceeds to step S410.

Then, in step S405, correlation processing section 108 extracts the first time stamp from time stamp DB 106 by retrieving the specified time stamp record, and reports the first time stamp to calculation processing section 110. Preferably, correlation processing section 108 deletes the retrieved time stamp from time stamp DB 106 at this time. By this means, it is possible to efficiently use the storage region assigned to time stamp DB 106.

Then, in step S406, correlation processing section 108 generates and reports the second time stamp to calculation processing section 110. FIG. 16(*c*) shows an example of the second time stamp to be generated. As described above, the second time stamp is generated in accordance with the timing the unencrypted data packet to which IPsec processing is already applied is intercepted, so that it is possible to more accurately specify the timing to finish applying IPsec processing and improve the accuracy of protocol latency measurement.

Then, in step S407, calculation processing section 110 calculates the difference between the first time stamp and the second time stamp. The first time stamp is directed to specifying the timing to start applying IPsec processing and the second time stamp is directed to specifying the timing to finish applying IPsec processing, and therefore the calculated difference corresponds to the elapsed time from the start of application of IPsec processing 15 to the end of application of IPsec processing 15.

Then, in step S408, identification processing section 104 acquires the packet size of the unencrypted data packet by retrieving the packet length in the IP header of the data packet stored in the socket buffer, and reports this packet size to calculation processing section 110.

Then, in step S409, calculation processing section 110 generates a statistical record by setting the reported index number in the index number field, the calculated elapsed time in the elapsed time field and the reported unencrypted packet size in the total packet size field in the predetermined statistical data format. FIG. 16(d) shows an example of the statistical record to be generated. When it is necessary to add elapsed time, for example, when the statistical record including the same index number is already stored in statistical DB 112, the statistical record is generated by retrieving the elapsed time and total packet size of the statistical record stored in statistical DB 112 and by adding the calculated elapsed time and the reported unencrypted packet size. Then, calculation processing section 110 updates statistical DB 112 by storing the generated statistical record in statistical DB 112.

Then, in step S410, intercepting section 102 returns the unencrypted data packet intercepted in step S401, to interception point 19. The returned unencrypted data packet is sent to TCP/UDP stack 12.

As described above, the received data packet follows interception route 97 after IPsec processing 15 is applied, so that the time stamp for specifying the timing to finish applying IPsec processing 15 is acquired and, further, identification information of this received data packet is acquired from the socket buffer for this received data packet.

As described above, the identification information of the received data packet does not change even if IPsec processing 15 is applied to this received data packet, so that it is possible to identify the received data packet at ease.

Further, in case where the received data packet intercepted from interception point 18 is a fragment, this fragment is subjected to IPsec processing in IP stack 13, and then is coupled to another fragment. Hence, with the present embodiment, intercepting section 102 intercepts the fragmented received data packet after the fragmented received data packets are coupled. Further, interception point 19 is arranged in a position to realize this. By this means, it is possible to efficiently generate only one second time stamp for specifying the timing to finish applying IPsec processing for fragmented received data packets.

As described above, according to the present embodiment, an index number of a data packet to which IPsec processing is not yet applied is generated and the generated index number is stored in a socket buffer region that maintains the index number before and after IPsec processing is applied. Consequently, the influence of IPsec processing 15 needs not to be taken into account at all upon generation of an index number, so that it is possible to generate the index number very easily without complicated arithmetic operations and prevent the increase in processing overhead accompanying protocol latency measurement. By this means, the user can learn the communication situation in real-time processing, and acquire measurement information required to perform QoS (Quality of Service) control in a communication terminal according to various situations or environment in which the communication terminal is used.

An embodiment of the present invention has been explained. Note that the above explanation is an illustration of a preferable embodiment of the present invention, and the present invention is not limited to this and can be implemented with various changes.

The disclosure of Japanese Patent Application No. 2007-339861, filed on Dec. 28, 2007, including the specification, drawings and abstract, is incorporated herein by reference in its entirety.

INDUSTRIAL APPLICABILITY

The protocol latency measuring apparatus and protocol latency measuring method according to the present invention provide an advantage of preventing an increase in processing overhead in a communication terminal accompanying protocol latency measurement, and are useful as the apparatus and method for measuring protocol latency in environment of encrypted communication.

The invention claimed is:

1. A protocol latency measuring apparatus that measures protocol latency due to internet protocol security processing in a communication terminal, the protocol latency measuring apparatus comprising:
    an identifier generator that generates an identifier of an unprocessed packet, the unprocessed packet being a packet before the internet protocol security processing;
    a database that stores the generated identifier with a first time stamp;
    a writer that writes the generated identifier in a storage region which maintains the identifier same before and after the internet protocol security processing in the communication terminal;
    a retriever that retrieves the identifier written in the storage region;
    an extractor that extracts the first time stamp stored in the database, with a same identifier as the retrieved identifier; and
    a calculator that calculates a difference between the extracted first time stamp and a second time stamp, as the protocol latency due to the internet protocol security processing, wherein
    the identifier includes an index number that guarantees a same packet before and after the internet protocol security processing, the index number being assigned to the unprocessed packet,
    an interceptor that intercepts the unprocessed packet and the processed packet and returns each of the intercepted processed and unprocessed packets to a respective interception point; and
    the index number of the unprocessed packet is a same as an index number of a corresponding processed packet, the processed packet being a packet after the internet protocol security processing.

2. The protocol latency measuring apparatus according to claim 1, further comprising:
    a time stamp generator that generates the first time stamp when the unprocessed packet is intercepted and that generates the second time stamp when the processed packet is intercepted.

3. The protocol latency measuring apparatus according to claim 2, wherein the interceptor intercepts the unprocessed packet at an interception point immediately before the internet protocol security processing, and that intercepts the processed packet at an interception point immediately after the internet protocol processing.

4. The protocol latency measuring apparatus according to claim 3, wherein:
when the unprocessed packet is divided into a plurality of packets before the internet protocol security processing, a plurality of processed packets are acquired from the plurality of divided packets according to the internet protocol security processing;
the interceptor intercepts the unprocessed packet prior to division, and sequentially intercepts the plurality of resulting processed packets; and
the calculator finishes calculating the protocol latency by calculating the difference using the second time stamp generated when a last packet of the plurality of resulting processed packets is intercepted.

5. The protocol latency measuring apparatus according to claim 4, wherein:
when a size of the unprocessed packet is larger than a predetermined value, the unprocessed packet is divided into a plurality of packets before the internet protocol security processing; and
the protocol latency measuring apparatus further comprises a decider that sequentially adds sizes of the plurality of processed packets sequentially intercepted until an addition value reaches the size of the unprocessed packet, and decides whether or not a processed last added packet is the last packet.

6. The protocol latency measuring apparatus according to claim 4, wherein the plurality of resulting processed packets each include a flag that indicates whether or not a processed packet of the plurality of resulting processed packets is the last packet; and
the protocol latency measuring apparatus further comprises a decider that decides that a processed packet including a flag, which indicates the last packet, is the last packet, with reference to flags included in the plurality of processed packets sequentially intercepted.

7. The protocol latency measuring apparatus according to claim 1, wherein the identifier is generated independently of data encryption.

8. The protocol latency measuring apparatus according to claim 1, wherein the index number of the unprocessed packet is different from an index number of a processed packet other than the corresponding processed packet.

9. A protocol latency measuring method for measuring protocol latency due to internet protocol security processing in a communication terminal, the protocol latency measuring method comprising:
generating an identifier of an unprocessed packet, the unprocessed packet being a packet before the internet protocol security processing;
storing the generated identifier with a first time stamp;
writing the generated identifier in a storage region that maintains the identifier same before and after the internet protocol security processing in the communication terminal;
retrieving the identifier written in the storage region;
extracting the first time stamp stored in the database, with a same identifier as the retrieved identifier; and
calculating a difference between the extracted first time stamp and a second time stamp as protocol latency due to the internet protocol security processing, wherein the identifier includes an index number that guarantees a same packet before and after the internet protocol security processing, the index number being assigned to the unprocessed packet,
intercepting the unprocessed packet and the processed packet and returning each of the intercepted processed and unprocessed packets to a respective interception point; and
the index number of the unprocessed packet is a same as an index number of a corresponding processed packet, the processed packet being a packet after the internet protocol security processing.

10. The protocol latency measuring method according to claim 9, further comprising:
generating the first time stamp when the unprocessed packet is intercepted and generating the second time stamp when the processed packet is intercepted.

11. The protocol latency measuring method according to claim 10, wherein the intercepting intercepts the unprocessed packet at an interception point immediately before the internet protocol security processing, and intercepts the processed packet at an interception point immediately after the internet protocol processing.

12. The protocol latency measuring method according to claim 11, wherein:
when the unprocessed packet is divided into a plurality of packets before the internet protocol security processing, a plurality of processed packets are acquired from the plurality of divided packets according to the internet protocol security processing;
the intercepting intercepts the unprocessed packet prior to division, and sequentially intercepts the plurality of resulting processed packets; and
the calculating finishes calculating the protocol latency by calculating the difference using the second time stamp generated when a last packet of the plurality of resulting processed packets is intercepted.

13. The protocol latency measuring method according to claim 12, wherein:
when a size of the unprocessed packet is larger than a predetermined value, the unprocessed packet is divided into a plurality of packets before the internet protocol security processing; and
the protocol latency measuring method further comprises sequentially adding sizes of the plurality of sequentially intercepted processed packets until an addition value reaches the size of the unprocessed packet, and deciding whether or not a last added processed packet is the last packet.

14. The protocol latency measuring method according to claim 12, wherein the plurality of resulting processed packets each include a flag that indicates whether or not a processed packet of the plurality of resulting processed packets is the last packet; and
the protocol latency measuring method further comprises deciding that a processed packet, including a flag which indicates the last packet, is the last packet, with reference to flags included in the plurality of processed packets sequentially intercepted.

15. The protocol latency measuring method according to claim 9, wherein the identifier is generated independently of data encryption.

16. The protocol latency measuring method according to claim 9, wherein the index number of the unprocessed packet is different from an index number of a processed packet other than the corresponding processed packet.

17. A protocol latency measuring apparatus that measures protocol latency due to internet protocol security processing in a communication terminal, the protocol latency measuring apparatus comprising:
- an identifier generator that generates an identifier of an unprocessed packet, the unprocessed packet being a packet before the internet protocol security processing;
- a database that stores the generated identifier with a first time stamp;
- a writer that writes the generated identifier in a storage region which maintains the identifier same before and after the internet protocol security processing in the communication terminal;
- a retriever that retrieves the identifier written in the storage region;
- an extractor that extracts the first time stamp stored in the database, with a same identifier as the retrieved identifier;
  - a calculator that calculates a difference between the extracted first time stamp and a second time stamp, as the protocol latency due to the internet protocol security processing;
  - an interceptor that intercepts the unprocessed packet and a processed packet, the processed packet being a packet after the internet protocol security processing and that returns each of the intercepted processed and unprocessed packets to a respective interception point; and
  - a time stamp generator that generates the first time stamp when the unprocessed packet is intercepted and that generates the second time stamp when the processed packet is intercepted.

18. A protocol latency measuring method for measuring protocol latency due to internet protocol security processing in a communication terminal, the protocol latency measuring method comprising:
- generating an identifier of an unprocessed packet, the unprocessed packet being a packet before the internet protocol security processing;
- storing the generated identifier with a first time stamp;
- writing the generated identifier in a storage region that maintains the identifier same before and after the internet protocol security processing in the communication terminal;
- retrieving the identifier written in the storage region;
- extracting the first time stamp stored in the database, with a same identifier as the retrieved identifier;
- calculating a difference between the extracted first time stamp and a second time stamp as protocol latency due to the internet protocol security processing;
  - intercepting the unprocessed packet and a processed packet, the processed packet being a packet after the internet protocol security processing and returning each of the intercepted processed and unprocessed packets to a respective interception point;
  - generating the first time stamp when the unprocessed packet is intercepted; and
  - generating the second time stamp when the processed packet is intercepted.

\* \* \* \* \*

UNITED STATES PATENT AND TRADEMARK OFFICE
CERTIFICATE OF CORRECTION

PATENT NO. : 8,711,706 B2  
APPLICATION NO. : 12/808256  
DATED : April 29, 2014  
INVENTOR(S) : Satoshi Senga et al.

Page 1 of 1

It is certified that error appears in the above-identified patent and that said Letters Patent is hereby corrected as shown below:

On the Title page of the printed patent, in item (75), country of residency of third inventor, please change "Taipei, (JP)" to -- Taipei, (TW) --

Signed and Sealed this  
Fifth Day of August, 2014

Michelle K. Lee  
*Deputy Director of the United States Patent and Trademark Office*